(12) United States Patent
Macken et al.

(10) Patent No.: US 9,030,773 B2
(45) Date of Patent: *May 12, 2015

(54) SENSING TEMPERATURE AT A SLIDER PROTRUSION REGION

(71) Applicant: Seagate Technology LLC, Cupertino, CA (US)

(72) Inventors: Declan Macken, Prior Lake, MN (US); James Dillon Kiely, Edina, MN (US); Manuel Charles Anaya-Dufresne, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,220

(22) Filed: Sep. 15, 2014

(65) Prior Publication Data
US 2015/0003223 A1  Jan. 1, 2015

Related U.S. Application Data

(63) Continuation of application No. 13/797,840, filed on Mar. 12, 2013, now Pat. No. 8,837,071.

(60) Provisional application No. 61/638,070, filed on Apr. 25, 2012.

(51) Int. Cl.
G11B 5/02   (2006.01)
G11B 5/60   (2006.01)
G11B 27/17  (2006.01)
G11B 5/31   (2006.01)
G11B 5/48   (2006.01)
G11B 5/00   (2006.01)

(52) U.S. Cl.
CPC .............. G11B 5/607 (2013.01); G11B 27/17 (2013.01); G11B 5/6005 (2013.01); G11B 5/6011 (2013.01); G11B 5/6088 (2013.01); G11B 5/314 (2013.01); G11B 2005/0021 (2013.01); G11B 5/4866 (2013.01)

(58) Field of Classification Search
None
See application file for complete search history.

(56) References Cited

U.S. PATENT DOCUMENTS

| | | | |
|---|---|---|---|
| 6,950,267 | B1 | 9/2005 | Liu et al. |
| 7,542,228 | B2 | 6/2009 | Knigge et al. |
| 7,796,356 | B1 | 9/2010 | Fowler et al. |
| 7,990,647 | B2 | 8/2011 | Lille |
| 8,149,541 | B2 | 4/2012 | Baumgart et al. |
| 8,837,071 | B2 * | 9/2014 | Macken et al. ............. 360/59 |
| 2010/0232067 | A1 | 9/2010 | Liners et al. |
| 2011/0299367 | A1 * | 12/2011 | Naniwa et al. ........... 369/13.33 |

OTHER PUBLICATIONS

International Search Report and Written Opinion dated Jul. 19, 2013 from PCT Application No. PCT/US2013/038245, 10 pages.

* cited by examiner

*Primary Examiner* — Regina N Holder
*Assistant Examiner* — Brian Butcher
(74) *Attorney, Agent, or Firm* — Hollingsworth Davis, LLC

(57) ABSTRACT

An apparatus includes a near-field transducer at or near an air bearing surface of the apparatus. A write pole is disposed at or near the air bearing surface and proximate the near-field transducer, respectively. A thermal sensor is disposed at the air bearing surface and within a protrusion region of the air bearing surface defined relative to at least one of the near-field transducer and the write pole. The thermal sensor is configured to produce a signal indicative of a temperature at the protrusion region.

20 Claims, 12 Drawing Sheets

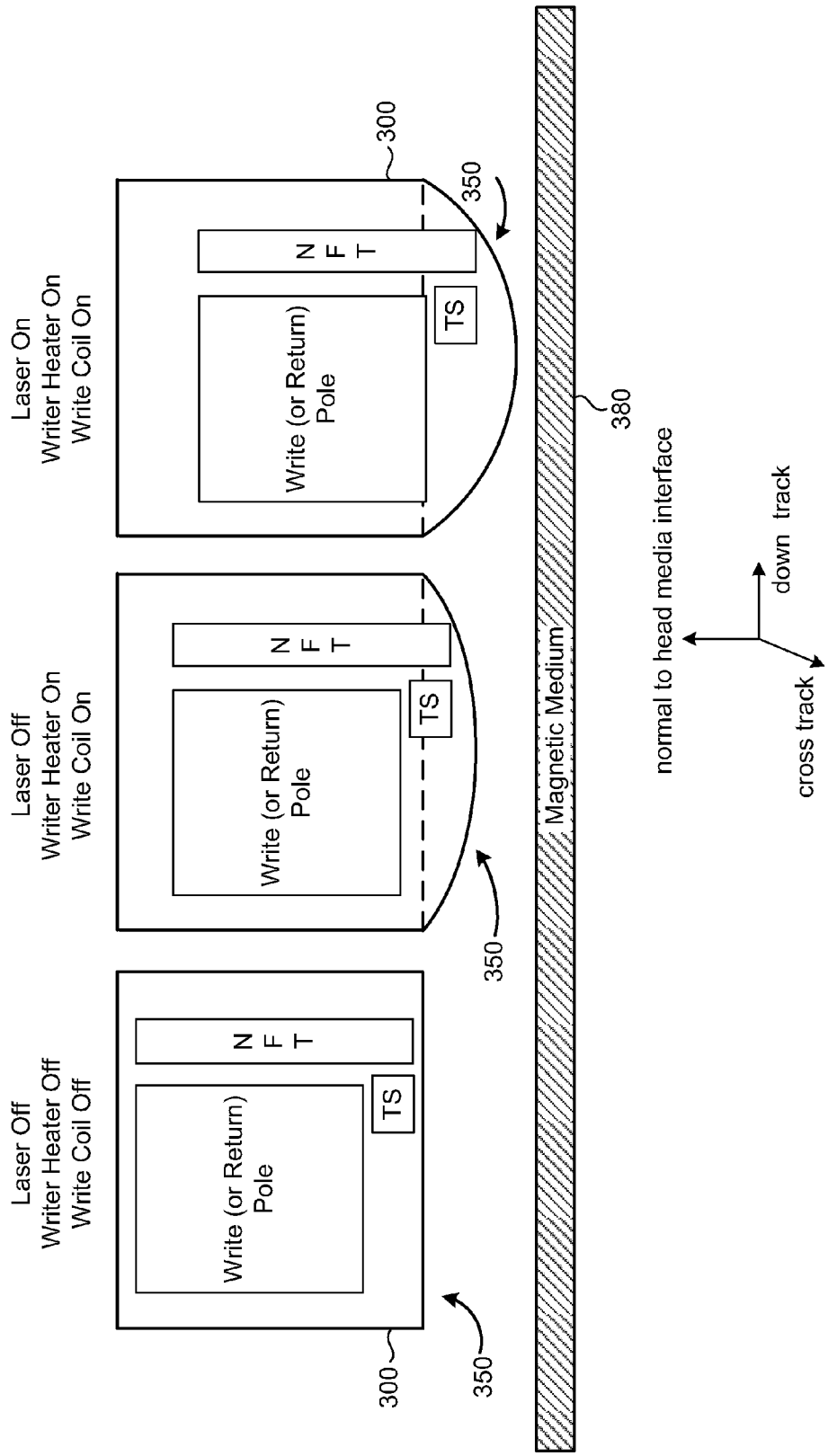

SENSING TEMPERATURE AT A SLIDER PROTRUSION REGION

RELATED PATENT DOCUMENTS

This application is a continuation of U.S. Ser. No. 13/797,840, filed Mar. 12, 2013, which claims the benefit of Provisional Patent Application Ser. No. 61/638,070 filed on Apr. 25, 2012, to which priority is claimed and which are hereby incorporated herein by reference in their entireties.

SUMMARY

Embodiments described in the disclosure are directed to approaches for sensing temperature at a slider protrusion region. An apparatus according to some embodiments includes a near-field transducer at or near an air bearing surface of the apparatus. A write pole is disposed at or near the air bearing surface and proximate the near-field transducer, respectively. A thermal sensor is disposed at the air bearing surface and within a protrusion region of the air bearing surface defined relative to at least one of the near-field transducer and the write pole. The thermal sensor is configured to produce a signal indicative of a temperature at the protrusion region.

According to some embodiments, the thermal sensor is configured to produce a signal that varies in relation to a change in separation between the air bearing surface and a magnetic storage medium in proximity to the apparatus. The apparatus may also include a processor coupled to the thermal sensor and configured to detect one or both of head-media separation changes and head-media contact using the thermal sensor signal.

Some embodiments involve methods for sensing temperature at a slider protrusion region. A near-field transducer and a write pole of a transducer comprising an air bearing surface are selectively activated. A protrusion region of the air bearing surface is thermally activated by at least one of the near-field transducer and the write pole. The temperature at the protrusion region is sensed.

These and other features and aspects of various embodiments may be understood in view of the following detailed discussion and accompanying drawings.

BRIEF DESCRIPTION OF THE DRAWINGS

FIGS. 3A-C are simplified views of head transducer protrusion resulting from thermal actuation of one or more transducer components in accordance with various embodiments;

DETAILED DESCRIPTION

The present disclosure generally relates to magnetic recording devices used for data storage. Data storage systems may include one or more transducers that respectively write (e.g., a writer) and read (e.g., a reader) information to and from a magnetic storage medium. It is typically desirable to have a relatively small distance or separation between a transducer and its associated media. This distance or spacing is referred to herein as "head-media separation" (HMS). By reducing the head-media separation, a reader and a writer is generally better able to both write and read data to and from a medium. Reducing the head-media separation also allows for surveying of magnetic storage medium topography, such as for detecting asperities and other features of the recording medium surface.

To establish head-media separation in a storage system, head-media contact is detected. Head-media contact detection and/or head-media separation sensing technologies are critical for the performance and reliability of hard disk drives. Higher contact detection repeatability enables lower active clearance, and thus higher recording density. Higher contact detection sensitivity reduces wear and improves reliability.

One approach for detecting contact involves evaluating a temperature profile for a recording head transducer before, during, and after contact between the head transducer and a surface of a magnetic recording medium. When the head transducer is actuated by a thermal actuator, the head transducer surface temperature will increase with the actuation due to the heat generated by the thermal actuator. The head transducer temperature will then be higher than the temperature of the medium. As such, the medium acts as a heat sink. When the head transducer contacts the medium, the head transducer surface temperature drops due to a change in heat transfer rate resulting from the contact. The head transducer surface temperature then continues to increase due to the continued thermal actuator heating as well as the added frictional heating. The change in temperature or excursion in temperature trajectory can be used to declare head-media contact. Details concerning head-media separation and contact determinations in accordance with various embodiments of the disclosure are provided in commonly owned U.S. patent application Ser. No. 12/941,461 filed Nov. 8, 2010, published as U.S. Publication 20120113207 which is incorporated herein by reference.

Figure 1:
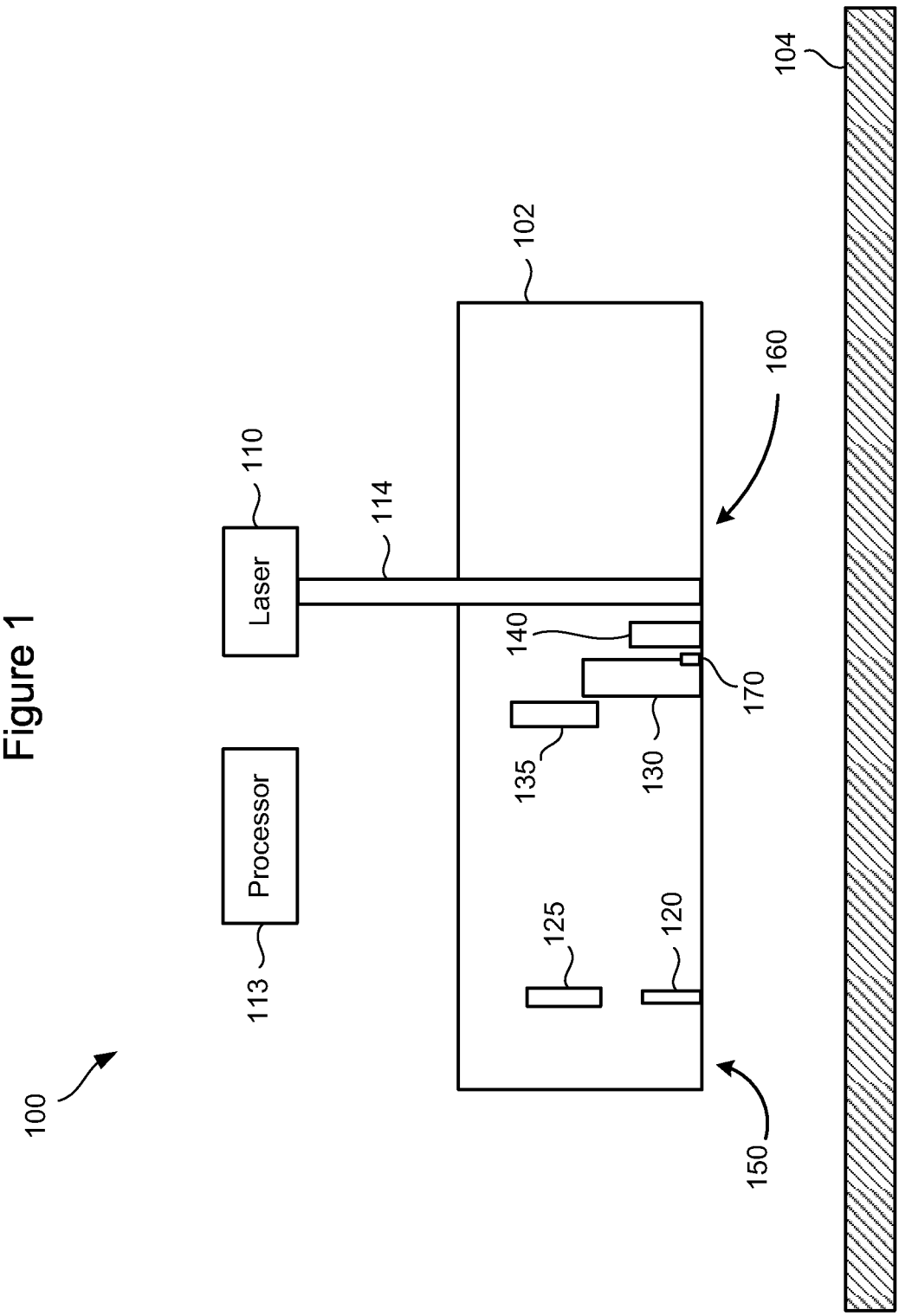
FIG. 1 is a block diagram of a head transducer arrangement in accordance with various embodiments.

A head transducer arrangement 100 for detecting head-media contact in accordance with various embodiments is illustrated in FIG. 1. The head transducer arrangement 100 includes a recording head transducer 102 comprising a slider 150 positioned proximate a rotating magnetic medium 104. The magnetic medium 104 is configurable for reading and/or writing data with head transducer 102. The surface of head transducer 102 facing magnetic medium 104 includes an air bearing surface (ABS) 160.

The head transducer 102 includes a reader 120 and a writer 130 proximate the ABS 160 for respectively reading and writing data from/to the magnetic medium 104. The writer 130 is configured for heat assisted magnetic recording (HAMR) and is located proximate a laser arrangement including light source 110 (e.g., laser diode). Light source 110 can be mounted external, or integral, to the head transducer 102. Light source 110 energizes a near-field transducer (NFT) 140 via a waveguide 114 proximate the ABS 160 and writer 130 respectively.

The writer 130 includes a corresponding heater 135, and reader 120 also includes a corresponding heater 125 according to various embodiments. Each of the heaters 125, 135 is thermally coupled to head transducer 102 and may be a resistive heater that generates heat as electrical current is passed through the heaters 125, 135. The heaters 125, 135 are not limited to resistive heaters, and may include any type of heating source. A processor can be configured to adjust the power supplied to one or both of heaters 125, 135. For example, power supplied to heater 135 can be adjusted when NFT 140 and/or writer 130 is activated to adjust the spacing between ABS 160 and magnetic medium 140.

At the air bearing surface 160 and proximate the NFT 140 and writer 130 is a thermal sensor 170. Although thermal sensor 170 can be a variety of types of thermal sensors, thermal sensor 170 is described herein as a resistance temperature sensor composed of materials having a temperature coefficient of resistance (TCR). Other types of thermal sensors can be employed, such as a varistor or a thermocouple, for example. One example of a TCR sensor is a dual-ended temperature coefficient of resistance sensor (DETCR). A TCR sensor measures temperature change by measuring the change in resistance, or rate of change in resistance, across the sensor. The thermal sensor 170 measures the temperature change at ABS 160 induced by all thermal condition changes from air pressure, clearance, head operation, and contact, among other changes.

The apparatus shown in FIG. 1 also includes a processor or controller 113 according to various embodiments. Processor 113 can be configured to perform a variety of functions, including controlling power delivery to laser 110 and to heaters 125 and 135. In some embodiments, processor 113 is configured to adjust power supplied to one or both of the laser 110 and writer heater 135 for purposes of adjusting fly height of transducer 102 relative to magnetic storage medium 104. The processor 113 can be coupled to thermal sensor 170 and configured to measure head-media separation and detect head-media contact in accordance with some embodiments.

Head-media contact is initiated by intentional head modulation during testing phases. However, head-media contact is also facilitated by intentional protrusion of the air bearing surface of the head transducer into the air gap between the head transducer and media in response to thermal actuation. In heat assisted magnetic recording (HAMR), the head transducer can be subjected to at least three sources of heat. One heat source is the write coil of the writer when actuated. The amount of heat generated by the writer is relatively fixed during write operations. A second source involves heating components included in the head transducer that can be selectively activated to intentionally expand the air bearing surface. In some configurations at least one of the selectively activated heating components (a reader heater) can be associated with the reader circuitry and/or at least one of the selectively activated heating components (a writer heater) can be associated with the writer circuitry. The heating components are controllable/programmable to vary the total amount of heat actuating the head transducer and, therefore, the magnitude of reader and/or writer protrusion. A third source is the NFT corresponding to the HAMR heat source, e.g., a laser. The NFT transforms laser energy to thermal energy in order to heat a spot on the magnetic medium during write operations. The heat generated by the NFT during write operations is relatively fixed.

Each of these heat sources alone, or in combination, cause the head transducer materials at the air bearing surface to expand. When the materials expand, they cause the air bearing surface to protrude into the air gap between the head transducer and the magnetic storage medium. For the highest likelihood of detecting contact, the TCR sensor is preferably located as close as possible to the maximum area of protrusion (e.g., at a location that protrudes at least about 70-80% of the location of maximum protrusion). For example, the TCR sensor may be located at or as close as possible to the close point of the transducer. Since protrusion is caused by heat generated in the head transducer, it is beneficial to locate a TCR sensor at or near the heat generation source or sources, e.g., the writer, NFT, and heater(s). A TCR sensor (e.g., a reference temperature sensor) may also be located away from these heat sources and the ABS, allowing for differential temperature measurements to be made.

In the embodiment illustrated in FIG. 1, thermal sensor 170 is situated within a protrusion region of at least one of the NFT 140 and the writer 130. The thermal sensor 170 is configured to produce a signal indicative of a temperature at the protrusion region. Thermal sensor 170 is also configured to produce a signal that varies in relation to a change in spacing between the magnetic medium 104 and the ABS 160 at the protrusion region. A signal produced by thermal sensor 170 is also indicative of contact between the medium 104 and the ABS 160 at the protrusion region.

A protrusion region, as referred to herein, is generally understood to be a region of ABS 160 that includes one or more heat-generating components of head transducer 102 that cause air bearing expansion due to heating by the respective heat-generating components. Representative heat-generating components of head transducer 102 include NFT 140, a write pole of writer 130, and heater 135. The protrusion region can include one or more components and may center around one or more of the transducer heat sources.

In some embodiments, the protrusion region extending from one of the NFT 140 and write pole of writer 130 may have a simple shape, such as a square, rectangular, circular, oval, or other smooth curved shape. In other embodiments, the protrusion region extending from one of the NFT 140 and write pole of writer 130 may have an irregular shape, such as a shape having complex curvature. In further embodiments, the protrusion region may be defined by a contoured region of the air bearing surface surrounding one or both of the NFT 140 and write pole of writer 130, where each location along the periphery of the contoured region represents protrusion of substantially equal magnitude. The protrusion region can define a planar (2-dimensional) or volumetric (3-dimensional) portion of the air bearing surface.

The protrusion region may be bounded by areas of minimal protrusion of the ABS relative to the area of maximum protrusion. Thus, the protrusion region may take any variety of shapes, and need not be circular. Also, the protrusion region may encompass different areas of an ABS depending on a given protrusion profile. For example, an area of an ABS may be considered to be in a protrusion region when multiple sources are actuated (e.g., a laser, write coil, and heater) but not included in the protrusion region when a single source of heat is actuated (e.g., a laser). The protrusion region can be based on the number of heat sources actuated and the amount of heat supplied by each source.

Figure 2:
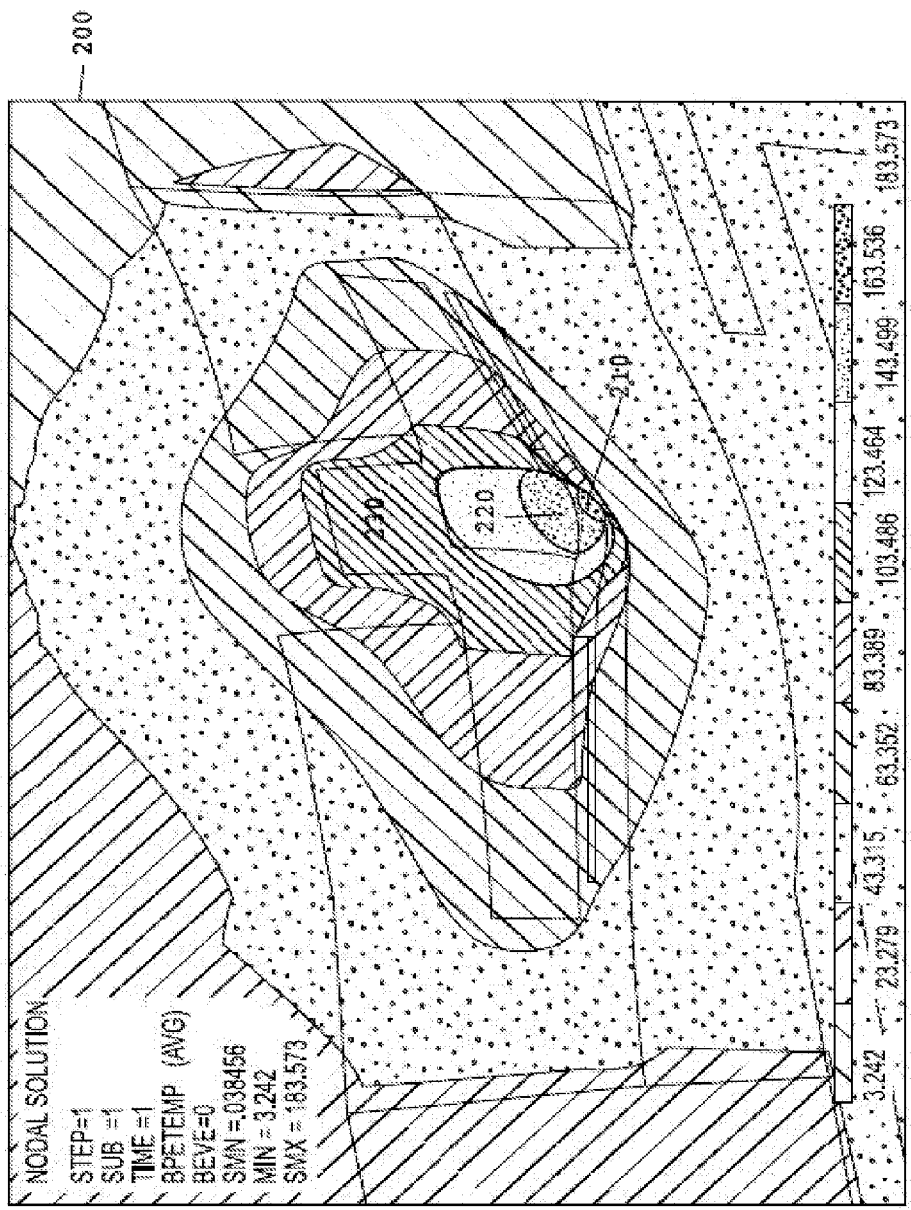
FIG. 2 is a contour diagram illustrating protrusion of a head transducer which is thermally actuated using a laser as an energy source for the heating.

An example of protrusion in an ABS caused by thermal actuation is provided in FIG. 2. While the materials comprising the air bearing surface expand to protrude into the air gap between the head transducer 200 and a medium, portions of the air bearing surface protrude more than others. Sections that experience the highest temperature increases in response to the thermal actuation protrude the most. For example, temperature/resistance readings at section 210 are higher than at sections 220 and 230, which are progressively lower.

While the hottest portions of the air bearing surface (e.g., section 210) correspond to the location of heating components on the head transducer, the entire transducer expands, not just the components generating heat (e.g., NFT, writer). As may be seen in FIG. 2, the ABS bulges with a graded protrusion reaching an area of maximum protrusion at the hottest section, section 210. Although all, or a large portion, of the air bearing surface expands in response to thermal actuation, the protrusion region includes the area of maximum protrusion and a surrounding region of the air bearing surface (e.g. a protruded region adjacent a protrusion maximum that expands to at least x % of the protrusion maximum, where x % is a predetermined threshold, such as one of the percentages listed herein). The size and location of the protrusion region depends upon the thermal element(s) actuated and the amount of heat supplied by each element. For example, the protrusion region of FIG. 2 could include regions 210 and 220 but exclude region 230. However, the size of the protrusion region can change depending on the number of heat sources actuated.

FIGS. 3A-C show general protrusion progression using a simplified cross-sectional view of a writer portion of a head transducer 300. In FIG. 3A head transducer 300 is in a non-thermally actuated state. In this state, the laser, writer heater, and writer coil are all off. Thus, head transducer 300 attains a default, non-actuated shape/state establishing a default separation between medium 380 and air bearing surface 350 of the head transducer 300. This default separation is illustrated by air gap 370.

FIG. 3B illustrates the transducer 300 with the writer coil and heater activated, but the laser inactive. Here, the writer-related components (write and/or return pole, NFT and thermal sensor (TS)) expand. The writer, or return, pole; the NFT; and the thermal sensor expand causing the air bearing surface 350 to protrude into the air gap 370. Thus, the air gap 370 and the distance between air bearing surface 350 and the medium 380 decreases. The dashed line indicates the default state/shape of air bearing surface 350. As can be seen, the actuation of the two heat sources expands the writer components, and adjoining head transducer materials, to protrude beyond the default shape of the head transducer 300 shown in FIG. 3A.

The protrusion is further expanded by the additional actuation of the laser, as shown in FIG. 3C. The additional heat produced by the NFT in response to the incident laser light further expands the air bearing surface 350 into air gap 370. The stroke, or magnitude of the protrusion along the cross track direction (z-axis) of the head transducer 300, changes with introduction of additional heat. However, the stroke does not necessarily change as one might expect, as discussed below.

Figure 4A:
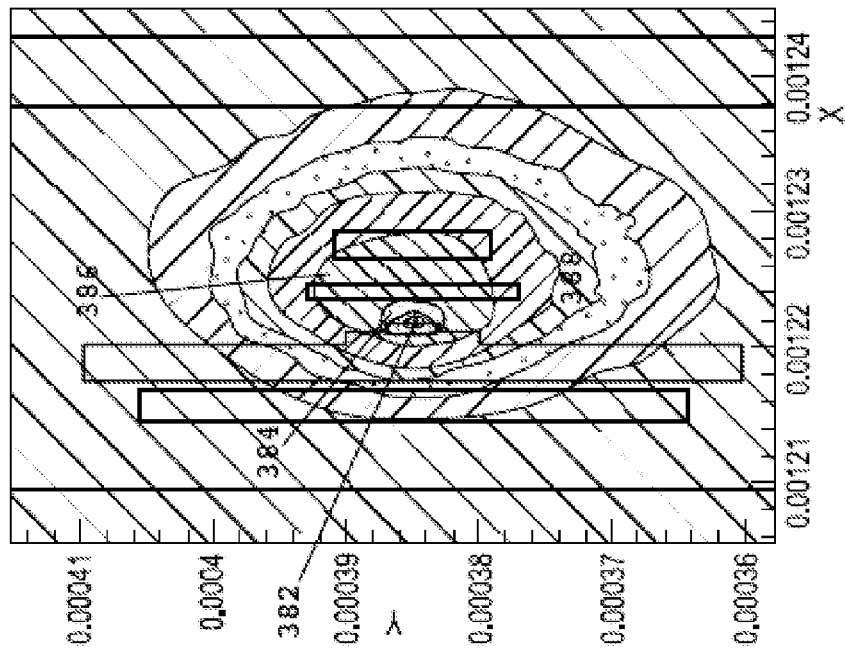
FIGS. 4A-B are contour diagrams illustrating protrusion profiles in accordance with various embodiments.
Figure 4B:
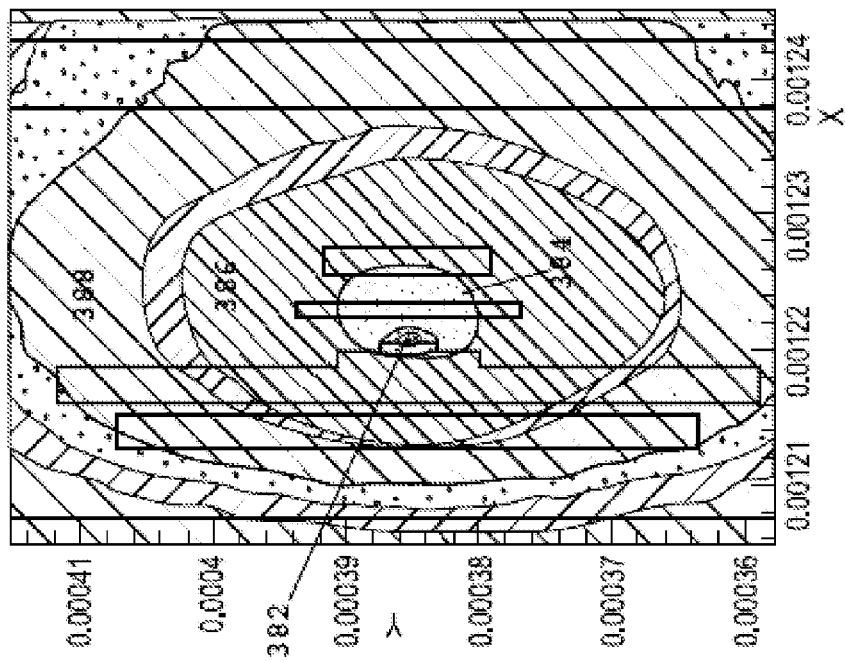

FIGS. 4A and 4B illustrate differing protrusion profiles based on the number of heat sources actuated in a head transducer. In FIG. 4A, a single heat source is actuated (e.g., a laser), whereas in FIG. 4B three heat sources are actuated (e.g., a laser, write coil, and writer heater). The same reference numerals are used to designate the same relative protrusion depth sections on both figures. For example, section 382 identifies the area of maximum protrusion of the head transducer with sections 384, 386, and 388 representing progressively less protrusion of the head transducer.

The single heat source of FIG. 4A generates a broad protrusion with a flatter maximum protrusion than the protrusion resulting from the combination of three heat sources in FIG. 4B. This may be seen, for example, by the differing sizes of section 388 on the respective figures. Section 388 represents the same protrusion depth range in each figure, however, in FIG. 4A, section 388 is much further away from the region of maximum protrusion in section 382 than in FIG. 4B. In contrast, the combination of three heat sources produces the more concentrated and narrower protrusion profile of FIG. 4B. Although there is increased heat supplied to the transducer in the profile of FIG. 4B, the result is a much narrower protrusion profile.

The increased pressure at the protruded surface causes this increased cooling and a correspondingly narrower protrusion profile. Cooling efficiency improves with reduced clearance to the media due to an increase in thermal transport efficiency and pressure. The greater the clearance to the media, the less pressure the air gap exerts on the protruded surface, resulting in a broader, hotter protrusion region. As the protruded surface reduces the clearance to the media, the air gap exerts increased pressure on the surface, increasing heat transfer, and creating the steeper, narrow protrusion profile shown in FIG. 4B. Head transducer cooling efficiency reaches a maximum when the head transducer contacts the media because the media provides an efficient thermal sink to the head transducer. According to embodiments of the disclosure, head-media contact can be detected by monitoring the interface cooling efficiency that is not caused by head modulation.

Figure 5:
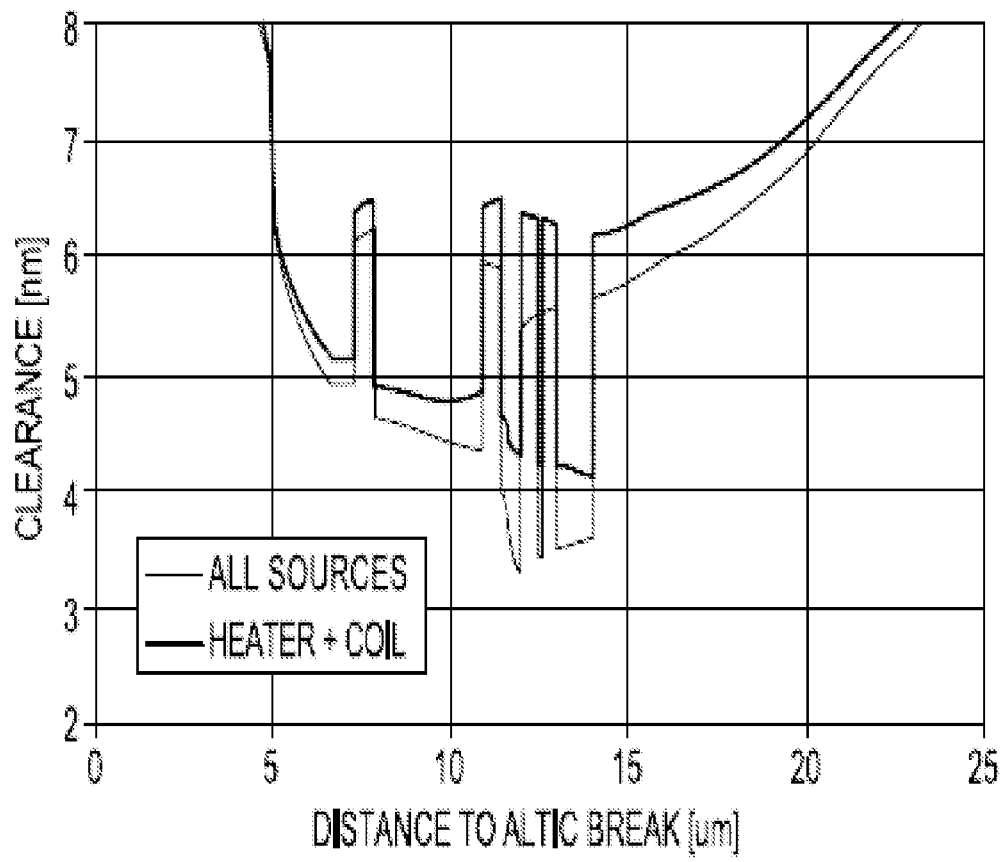
FIG. 5 is a graph illustrating transducer protrusion attributed to laser actuation.

Since the increase in heat resulting from HAMR recording affects the protrusion profile of a thermally actuated head transducer, FIG. 5 illustrates the amount of protrusion attributed to the HAMR heat source (e.g., laser/NFT). The thick line identifies example head-media separation when the head is actuated using only the write coil and a heater such as in traditional magnetic recording. However, the thin line identifies head-media separation for the same head design when thermally actuated with the write coil, a heater, and a laser/NFT. As can be seen in FIG. 5, the additional heat supplied by the laser introduces up to about an additional nanometer of protrusion in the ABS. It is noted that the size of laser-induced writer protrusion along an axis normal to the ABS varies from transducer to transducer. In general, laser-induced writer protrusion along the axis normal to the ABS can range between about 0.5 and 5 nm, with about 2-3 nm representing a typical protrusion range.

This differential in clearance primarily occurs near the location of the NFT on the ABS surface. As the distance from the NFT increases, the differential in clearance reduces and then disappears. When considering the dimensions of head-media separation (e.g., 20 nm or less), a one nanometer increase of the ABS due to laser-induced protrusion is significant, while a 2-3 nanometer increase is substantial. To account for the increased protrusion, the relationship between the laser power and protrusion can be evaluated.

Figure 6:
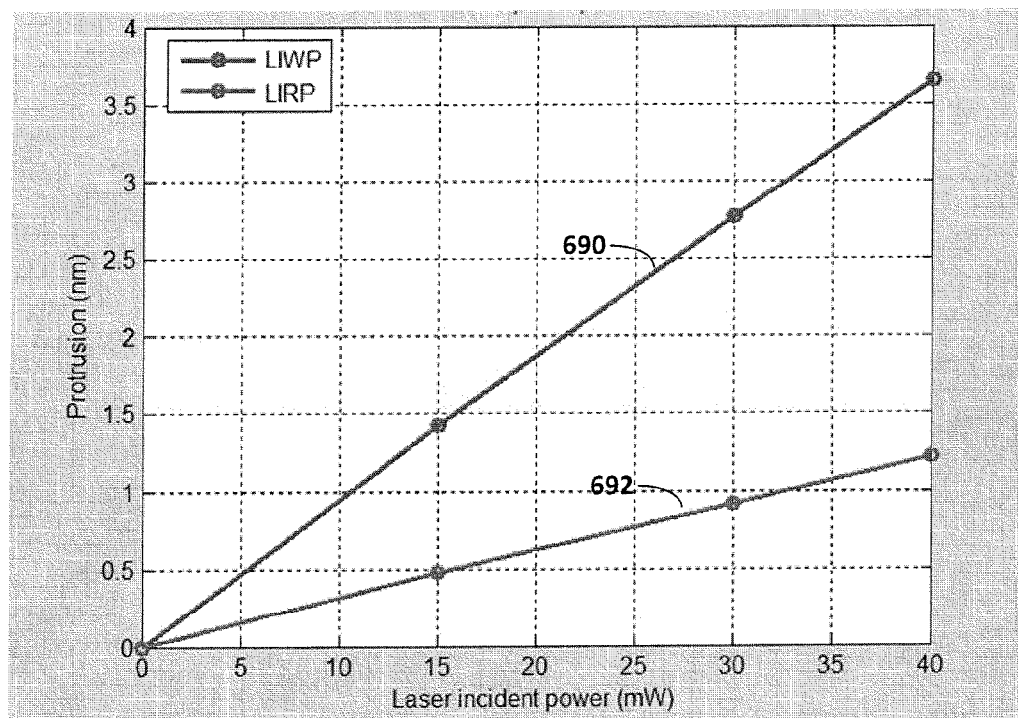
FIG. 6 is a graph illustrating a relationship between laser power and protrusion size.
Figure 7:
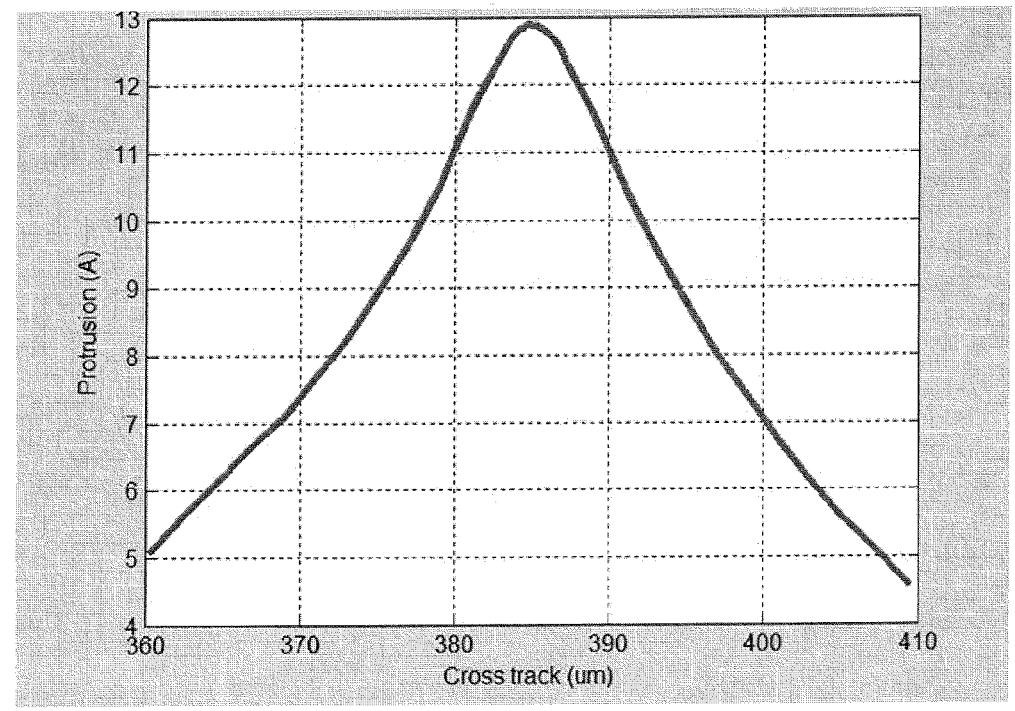
FIG. 7 is a graph showing a cross-track protrusion profile of a laser actuated transducer.

The relationship between laser power and protrusion is illustrated in the graphs of FIGS. 6 and 7. Modeling data in FIG. 6 shows that ABS (e.g., writer region) protrusion along an axis normal to the ABS is linearly related to increasing laser power (e.g., power of incident laser light received by the NFT). As laser power increases, so does protrusion of an air bearing surface along the axis normal to the ABS. The magnitude of ABS protrusion thus changes as a function of laser light power delivered to the NFT. As can be seen in FIG. 6, the size of the protrusion region along the axis normal to the ABS changes substantially linearly as a function of laser light power delivered to the NFT. Notably, this relationship applies to both the write pole (line 690) and the read pole (line 692). However, due to the read pole's location further away from the NFT, the linear relationship for the read pole (line 692) is less direct than that of the write pole (line 690). Protrusion caused by heating components at the write pole also affect protrusion at the read pole. Therefore, this ancillary effect of the laser must be accounted for when analyzing reader protrusion, e.g., using Wallace spacing.

As discussed in connection with FIG. 4B, the protrusion profile of the air bearing surface is relatively steep, narrowing to an area of maximum protrusion with a small (approximately 1 nm) width. An example of such a profile is modeled in FIG. 7. The profile shows the inverted outline of a protrusion region from a sightline parallel to the original air bearing surface.

Figure 8:
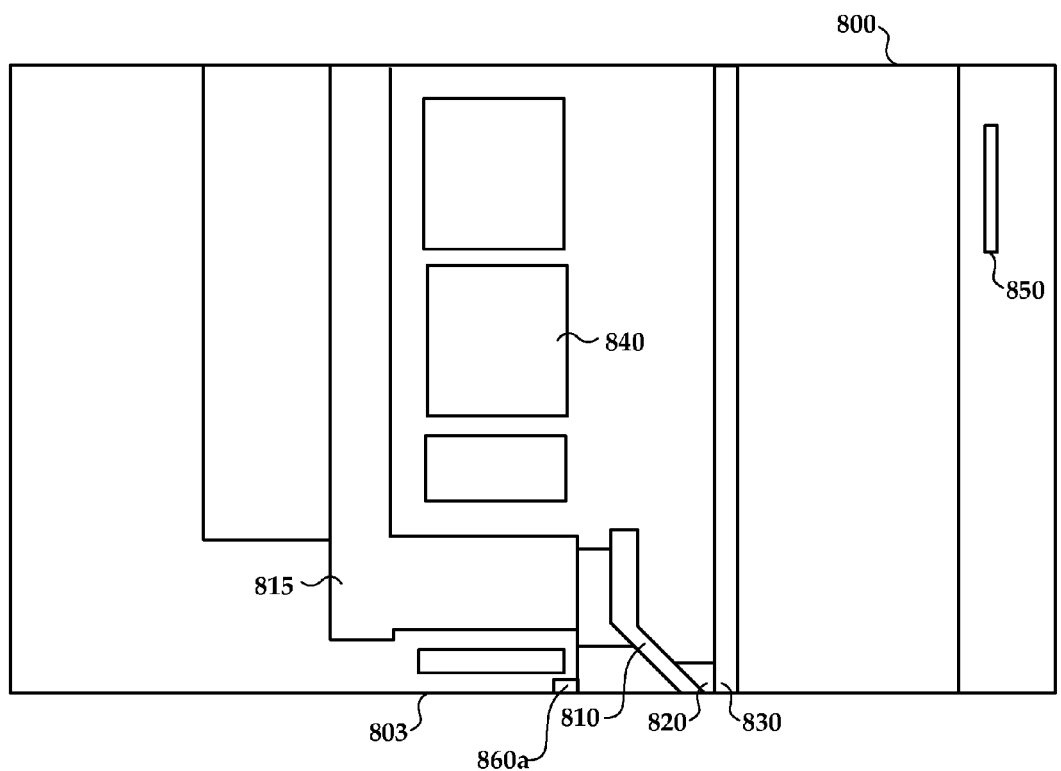
FIG. 8 is a cross-section view of a head transducer including a thermal sensor in accordance with various embodiments.

A representative embodiment of a head transducer that incorporates a thermal sensor at a protrusion region of the transducer is shown in FIG. 8. FIG. 8 shows a cross-section of a writer portion of head transducer 800 in accordance with various embodiments. An NFT 820 is located between a write pole 810 and a waveguide 830. The portion of head transducer 800 illustrated in FIG. 8 includes three heat sources; a write coil 840, NFT 820, and a heater 850.

A thermal sensor 860, such as a TCR sensor, is located at a protrusion region of the write pole 810 and the NFT 820. In one configuration, at least a portion of thermal sensor 860 is co-extensive with a portion of the write pole 810 along an axis normal to the air bearing surface. Thermal sensor 860 is situated in an uptrack/downtrack direction from at least one of the NFT 820 and write pole 810. It is understood that thermal sensor 860 can be located elsewhere relative to write pole 810 and NFT 820 yet still be located within a protrusion region of these components. For example, thermal sensor 860 can be located between write pole 810 and a coil 840 that energizes the write pole 810. By way of further example, thermal sensor 860 can be located between a waveguide 830, which is optically coupled to NFT 820, and heater 850 (e.g., positioned nearer to waveguide 830 than heater 850).

According to some embodiments, a protrusion region can be a region of the air bearing surface 803 between the write pole 810 and a write return pole 815; between a write return pole 815 and NFT 820, and between write return pole 815 and a waveguide 830. In other embodiments, a protrusion region can be considered a region of ABS 803 originating at a heat source, such as NFT 820 or write pole 810, and extending generally outwardly from about 1-3 micrometers around the heat generating element(s). Here, the location of maximum ABS protrusion can occur at or between NFT 820 and write pole 810, for example. The protrusion region can further be considered a region of ABS 803 extending outwardly from a location of maximum protrusion to locations that expand by at least a predetermined percentage of maximum ABS protrusion. In various embodiments, the protrusion region may be defined by a region of ABS 803 that protrudes at least 70%, or at least 80%, or at least 90% or at least 95% relative to a region of maximum protrusion of ABS 803.

In the embodiment illustrated in FIG. 8, thermal sensor 860 is located between the write pole 810 and a write return pole 815. However, thermal sensor 860 can be located on the other side of the waveguide 830, as discussed above. For inclusion within a protrusion region, regardless of the number of heat sources or amount of heat supplied, thermal sensor 860 is no more than about 3 µm away from one of the NFT 820 and write pole 810 according to some embodiments. In some embodiments, thermal sensor 860 is no more than about 2 µm away from one of the NFT 820 and write pole 810. In some embodiments, thermal sensor 860 is no more than about 1.5 µm away from one of the NFT 820 and write pole 810. In still further embodiments, thermal sensor 860 is no more than about 1 µm away from one of the NFT 820 and write pole 810.

In accordance with various embodiments, the protrusion region comprises a region of the air bearing surface originating at one of the NFT 820 and write pole 810 and extending no more than about 2-3 µm therefrom. In some embodiments, thermal sensor 860 is no more than about 1.8 µm away from one of the write pole 810 and NFT 820, and no more than about 1.2 µm away from the other of the write pole 810 and NFT 820.

In various embodiments, the thermal sensor 860 is located in the protrusion region at an area that protrudes at least 70% relative to the area of maximum protrusion in the protrusion region, preferably at least 80% relative to the area of maximum protrusion in the protrusion region, and more preferably at least 90% or 95% relative to the area of maximum protrusion in the protrusion region. While only one thermal sensor 860 is shown in FIG. 8, the head transducer 800 can be implemented to include two or more thermal sensors in the writer protrusion region (e.g., which includes write pole 810 and NFT 820).

Figure 9:
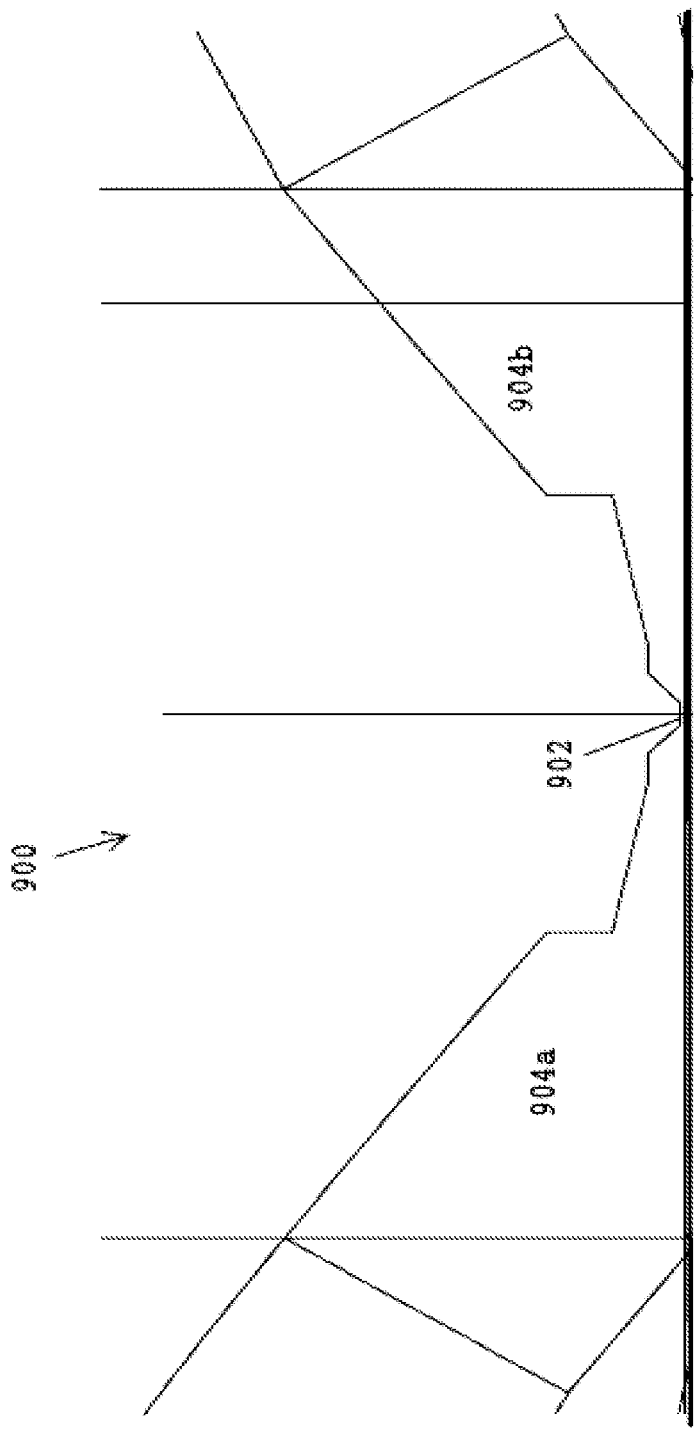
FIG. 9 is a plan view of a temperature coefficient of resistance (TCR) sensor in accordance with various embodiments.

FIG. 9 illustrates a representative TCR sensor 900 in accordance with various embodiments. TCR sensor 900 includes a TCR element 902 with ends that are respectively coupled to leads 904a and 904b. TCR element 902 is located within the writer protrusion region and can be configured for sensing contact with a surface of a magnetic storage medium. TCR element 902 can have either a positive TCR or a negative TCR. The leads 904a and 904b are respectively coupled to a detector configured to detect head-media contact based on a signal generated by TCR element 902.

In accordance with other embodiments, TCR sensor 900 can be configured as a dual-stage TCR sensor, which includes a first sensor stage 902 (e.g., a hot TCR wire sensor) and a second sensor stage 904a-b (e.g., a cold TCR wire sensor). The terms hot and cold associated with the first and second sensor stages 902 and 904a-b are used herein for purposes of explanation, in view of the significantly different temperatures at which these two sensor stages typically operate (e.g., ~100° C. and ~10° C., respectively). TCR sensor 900 is located within the writer protrusion region.

The first sensor stage 902 is sensitive to changes in heat flow across a small sensing area relative to that of the second sensor stage 904a-b. Accordingly, the first sensor stage 902 has greater sensitivity to changes in heat flow for detecting asperities of the magnetic recording medium. The second sensor stage 904a-b is sensitive to changes in heat flow across a large sensing area relative to that of the first sensor stage 902. As such, the second sensor stage 904a-b has greater sensitivity to changes in heat flow for detecting contact and spacing between the head transducer and the surface of the magnetic recording medium.

In a dual-stage embodiment according to FIG. 9, the first and second sensor stages 902 and 904a-b define a unitary sensing structure. The second sensor stage 904a-b includes second sensor stage portions 904a and 904b, and the first sensor stage 902 is situated between the second sensor portions 904a and 904b. In this configuration, the first and the second sensor stages 902 and 904a-b are coupled in series. As discussed above, the first sensor stage 902 is configured to preferentially sense asperities of a magnetic recording medium, and the second sensor stage 904a-b is configured to preferentially sense proximity to, and contact with, a surface of the magnetic recording medium. In other embodiments, the second sensor stage 904a-b includes two spaced-apart portions 904a and 904b that are situated at spaced-apart locations on the air bearing surface. In such embodiments, the two spaced-apart portions 904a and 904b can be used to concurrently measure contact with at least two spaced-apart locations of the surface of the medium.

When the dual-stage TCR sensor 900 makes contact with a surface of the magnetic recording medium, the signal output by the dual-stage TCR sensor 900 is a combined signal produced by both the small hot first sensor stage 902 and the much larger cooler second sensor stage 904*a-b* that interacts with a significantly larger portion of the disk surface, thus resulting in a larger signal due to the larger area heat transfer/influence.

The TCR sensor 900 is able to sense temperatures of intense heat due to being situated in the protrusion region near the NFT. Therefore, high temperature materials such as zinc oxide (e.g., Al- or Ga-doped ZnO), high temperature metals, and ceramics may be used in the TCR sensor 900. Suitable high temperature materials for the TCR sensor include NiFe and/or Ru.

Further, the physical presence of TCR sensor 900 within the protrusion region of the air bearing surface increases the area of maximum protrusion. The location of the TCR sensor 900 serves to increase the contact area of the protrusion region relative to a protrusion region devoid of a TCR sensor 900. The increased contact area serves to widen the profile of the protrusion region and reduce the magnitude of the protrusion region relative to a profile of a protrusion region devoid of a thermal sensor. This increased area of maximum protrusion increases the likelihood and reliability of contact detection with a greater area of contact.

Figure 10:
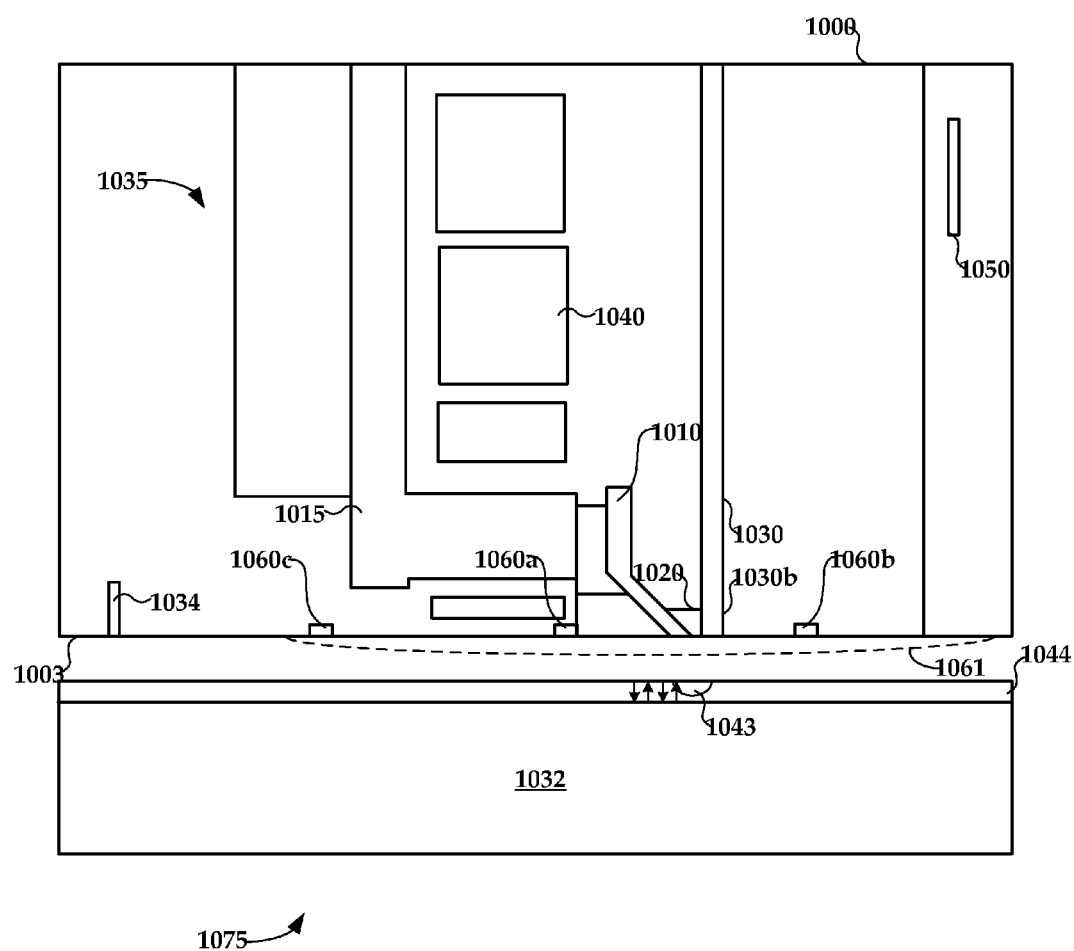
FIG. 10 is an enlarged schematic sectional view of a head transducer arrangement in accordance with various embodiments.

FIG. 10 depicts detailed structures and features that may be included in a HAMR transducer in accordance with various embodiments. FIG. 10 shows a cross-section of a head transducer 1000 in accordance with various embodiments. An NFT 1020 is located between a write pole 1010 and a waveguide 1030. The portion of head transducer 1000 illustrated in FIG. 10 includes three heat sources; a write coil 1040, NFT 1020, and a heater 1050, which cause a thermal protrusion, indicted by dashed line 1061.

One or more thermal sensors, e.g., TCR sensors, can be located within a protrusion region at one or more optional locations, as shown in FIG. 10. FIG. 10 shows optional thermal sensors 1060*a*, 1060*b*, 1060*c* located at different locations within the region of protrusion 1061. In many embodiments only one thermal sensor is used. In some embodiments, as illustrated by thermal sensor 1060*a*, a thermal sensor is located in the region of the writer 1035, near the write pole 1010, return pole 1015, and/or the NFT 1020. In one configuration, at least a portion of thermal sensor 1060*a* is co-extensive with a portion of the return pole 1015 along an axis normal to the air bearing surface. Thermal sensor 1060*a* is situated in an uptrack/downtrack direction from at least one of the NFT 1020 and write pole 1010. In some configurations, a thermal sensor is located outside the region of the writer 1035. For example, thermal sensor 1060*b* is located at a second optional location within the protrusion region of the air bearing surface and adjacent the write pole 1010 (but outside of the writer components) on a side of the writer 1035 opposite the reader 1034. Thermal sensor 1060*b* is located between a waveguide 1030, which is optically coupled to NFT 1020, and heater 1050 (e.g., positioned nearer to waveguide 1030 than heater 1050). Thermal sensor 1060*c* illustrates a third optional location within the protrusion region of the air bearing surface and adjacent the return write pole 1015 (but outside of the writer components) between the writer 1045 and the reader 1034.

It is understood that thermal sensors 1060*a*, 1060*b*, 1060*c* illustrate three optional locations for the thermal sensor. In other embodiments, the thermal sensor can be located elsewhere relative to write pole 1010 and NFT 1020 yet still be located within a protrusion region of these components. For example, thermal sensor can be located between write pole 1010 and a coil 1040 that energizes the write pole 1010.

According to some embodiments, a protrusion region can be a region of the air bearing surface 1003 between the write pole 1010 and a write return pole 1015; between a write return pole 1015 and NFT 1020, and/or between write return pole 1015 and a waveguide 1030. In other embodiments, a protrusion region can be considered a region of ABS 1003 originating at a heat source, such as NFT 1020, write pole 1010, and/or heater and extending generally outwardly from about 1-3 micrometers around the heat generating element(s). In FIG. 10, the ABS protrusion is indicated by dashed line 1061, and the location of maximum ABS protrusion can occur at or between NFT 1020 and write pole 1010, for example. The protrusion region can be considered a region of ABS 1003 extending outwardly from a location of maximum protrusion to locations that expand by at least a predetermined percentage of maximum ABS protrusion (e.g., 70%, 80%, 90%, or 95%).

The head transducer 1000 may comprise a relatively thick substrate on which is disposed the multiplicity of thin layers. The layers cooperate to define the respective components of the head transducer 1000. The layers include a multiplicity of layers tailored to form, for example, a magnetic writer 1035 and a magnetic reader 1034. The layers may also be patterned to form coils 1040 which, when energized with an electrical current, produce a magnetic field passes through the writer 1035 and through a portion of the writeable medium 1075. One end or terminus 1010 (referred to as a write pole) of the writer 1035 may be configured to produce a high flux density of the magnetic field. Another end or terminus 315 (referred to as a return pole) of the writer 1035, coupled to the write pole 1010 via a yoke of the writer, may be configured to produce a lower flux density.

The layers of the head transducer 1000 also layers tailored to form a (passive) waveguide 1030, an NFT 1020, and the thermal sensor shown in FIG. 10 at optional locations as sensor 1060*a*, 1060*b*, 1060*c*. A laser (not shown in FIG. 10) is optically coupled to the NFT 1020 through the waveguide 1030. The laser may be formed in the head transducer layers, may be mounted on the heat transducer or may be disposed in a cavity in the head transducer and The writeable medium 1075 may be configured in any known way, but typically it includes a plate or substrate 1032 on which at least a hard magnetic layer 1044 is deposited or otherwise formed. A small portion or spot 1043 of the layer 1044 may be heated sufficiently to reduce the coercivity of the material enough so that the magnetic field from the magnetic write pole 1010 is strong enough to change the magnetization direction of the recording layer 1044. Bits of information may then be recorded in the form of a perpendicular upward downward magnetization direction for a series of magnetic domains in the layer 1044.

The heating of the spot 1043 in connection with the write procedure may be provided directly by the NFT 1020 and indirectly by the laser. When the laser is energized, laser light is emitted from the laser is coupled into the waveguide, whether by end-fire coupling or otherwise. The laser light is conveyed to a distal end 1030*b* of the waveguide 1030. In some cases, the distal end may correspond to a focal point or focal region of a solid immersion mirror (SIM) or a solid immersion lens (SIL). Located at or near the distal end 1030*b* is the NFT 1020, which may be formed as part of the plurality of layers. The NFT 1020 utilizes plasmons to convert the power density of the incident laser light into a high power density in a near-field region that is typically smaller than the diffraction limit for the laser light. The high power density provided by the NFT 1020 in the near-field region is absorbed by the nearby writeable medium 1075 to produce localized heating of the spot 1043. By positioning an emitting end of the NFT 1020 close enough to the write pole 1010 of the writer 1035, at least a portion of the heated spot 1043 can be exposed to the high magnetic flux emitted by the write pole 1010 before passing out of range (due to the relative motion of the writeable medium 1075) so that the magnetic field at the write pole 1010 is capable of changing the magnetization direction of the spot 1043.

The heating of spot 1043 also causes protrusion (indicated by dashed line 1061) of a region of the air bearing surface 1003 of the head 1000. To measure the temperature change and corresponding protrusion, one or more thermal sensors, e.g., one or more of thermal sensors 1060a, 1060b, 1060c can be located proximate the NFT 1029 and/or write 1010 or return 1015 poles in a protrusion region. FIG. 10 shows several optional locations for a thermal sensor. Thermal sensor 1060a is located at a first optional location within the protrusion region of the air bearing surface and within the writer 1035, e.g., between the write return pole 1015 and write pole 1010; thermal sensor 360b is located at a second optional location within the protrusion region of the air bearing surface and adjacent the write pole 1010 (but outside of the writer components); and thermal sensor 1060c is located at a third optional location within the protrusion region of the air bearing surface and adjacent the return write pole 315 (but outside of the writer components.)

The NFT 1020 may be a suitably sized pin or other structure and may be made of a metal such as gold or other suitable materials. The NFT 1020 may have any suitable design known in the art. The NFT 1020 is shown in FIG. 10 to be close to but separated from waveguide 1030, but in other embodiments the NFT may be disposed within the waveguide 1030. In still other embodiments, the laser may be integrated into the head transducer and the waveguide may be omitted. In an integrated laser configuration, the NFT may couple directly to the integrated semiconductor laser.

Figure 11:
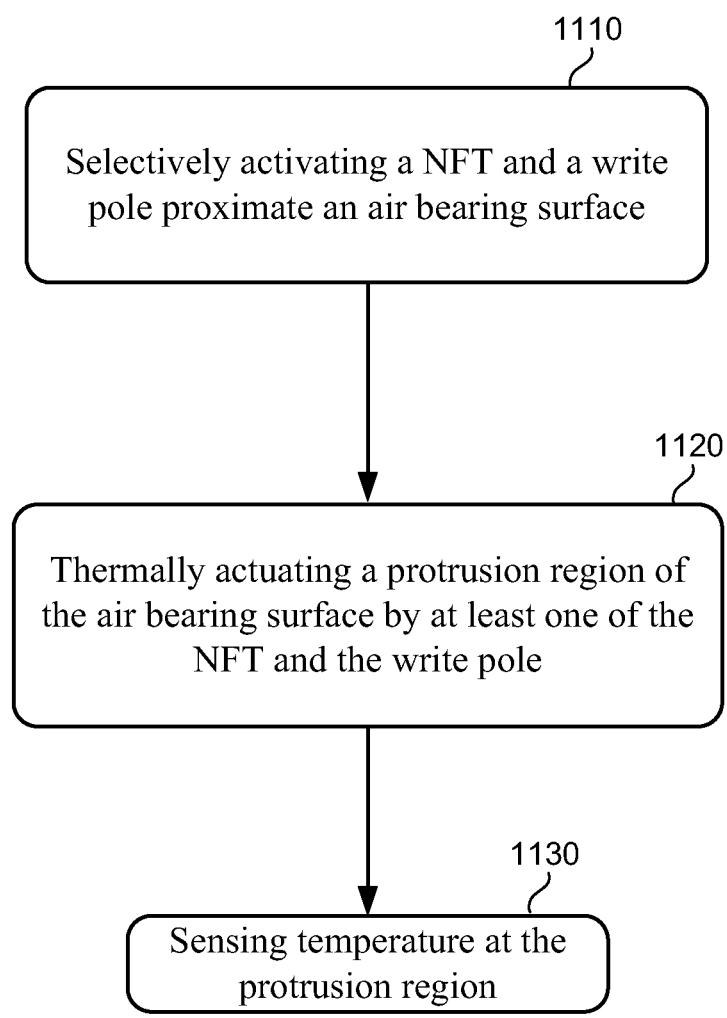
FIGS. 11-13 are flow charts showing various processes of methods for detecting head-media contact and/or head-media separation changes in accordance with various embodiments.

With reference to FIG. 11, a method for sensing temperature in a head transducer is set forth in accordance with various embodiments. A write pole and NFT located proximate an air bearing surface of the head transducer are selectively activated 1110. For example, only one component, or both components, can be activated during various operations. The number of components activated, for example, may be based a need for determining head-media contact, e.g., during manufacturing testing or field testing. At least one of the NFT and write pole is activated to thermally actuate a protrusion region of the air bearing surface 1120. The protrusion region preferably includes a region of the air bearing surface that experiences geometric expansion and contraction due to repeated heating and cooling resulting from activation and deactivation of one or both of the NFT and write pole. In various embodiments, the protrusion region includes the close point of the head transducer. Thermal actuation involves supplying heat to the protrusion region by activation of one or both of the NFT and write pole to cause the region to protrude. A thermal sensor located within the protrusion region detects the temperature at the protrusion region 1130. The temperature change, or rate of temperature change, may then be used for a variety of purposes, such as to detect head-media contact and/or head-media separation and changes thereof.

Figure 12:
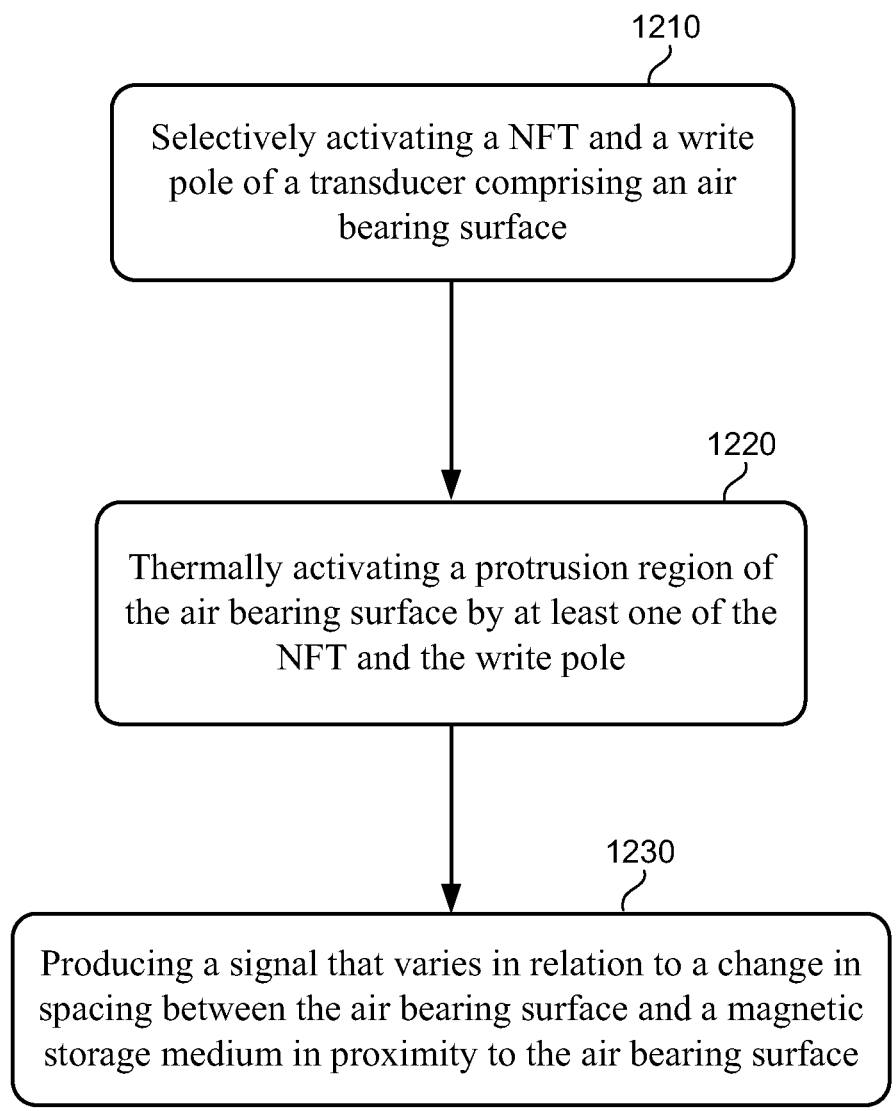

FIG. 12 illustrates a method for sensing head-media separation according to various embodiments. A write pole and NFT located proximate an air bearing surface of the head transducer are selectively activated 1210. For example, only one component, or both components, can be activated, such as for reasons discussed above. At least one of the NFT and write pole thermally actuate a protrusion region of the air bearing surface 1220. Thermal actuation involves supplying heat to the protrusion region to cause the region to protrude. In response to the thermal actuation, a thermal sensor located within the protrusion region produces a signal that varies in relation to a change in spacing between the air bearing surface at the protrusion region and a magnetic storage medium proximate the air bearing surface 1230. The signal, e.g., resistance or rate of change of resistance, can also be indicative of contact between the air bearing surface and magnetic storage medium in proximity to the air bearing surface as discussed above.

In some embodiments, the thermal sensor signal can be combined with a second thermal sensor signal produced by a second thermal sensor located away from the protrusion region, such as at a transducer location not influenced by the thermal boundary condition at the close point or air bearing surface. The common mode of the two sensor signals can be subtracted or canceled, such that the resulting signal is indicative of head-media separation changes and/or head-media contact.

Figure 13:
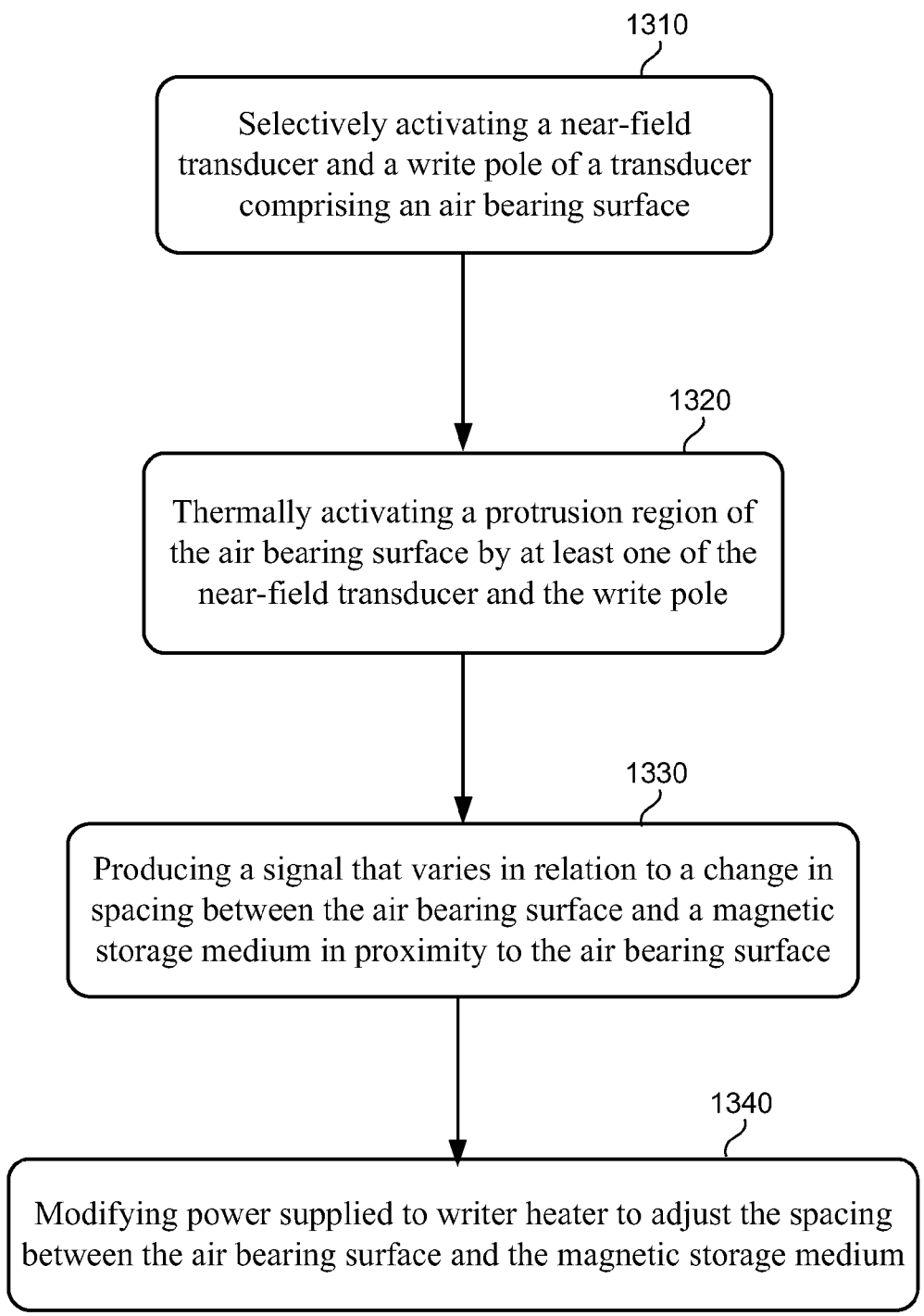

A method for detecting head-media contact is disclosed in the embodiment of FIG. 13. As in previous embodiments, a write pole and NFT located proximate an air bearing surface of the head transducer are selectively activated 1310. One or both of the NFT and write pole thermally actuate a protrusion region of the air bearing surface 1320. Thermal actuation involves supplying heat produced by one or both of the write pole and NFT to the protrusion region to cause the region to protrude. Alternatively, a heater (e.g., writer heater) is used in combination with one or both of the NFT and the write pole to contribute to thermally actuation of the protrusion region. In response to the thermal actuation, a thermal sensor located within the protrusion region produces a signal that varies in relation to a change in spacing between the air bearing surface at the protrusion region (which preferably includes the close point of the transducer) and a magnetic storage medium 1330. The thermal sensor signal is used to detect whether the protrusion region has contacted the storage medium. In response to the signal, the power supplied to a writer heater is modified to adjust the spacing between the head transducer and the storage medium 1340.

In cases where the power supplied to the write coil and NFT is largely fixed, such as during write operations, the temperature of the head transducer and corresponding protrusion region is largely controlled by adjusting the power supplied to the writer heater. In some cases, the power of laser light supplied to the NFT can be adjusted to modify the heat produced by the NFT. In such cases, the fly height of the transducer can be adjusted by altering the laser light power, alone or in combination with one or both of write pole and writer heater activation.

Various techniques can be employed for detecting head-media contact and separation according to embodiments of the disclosure. In some embodiments, the DC signal from a resistance temperature sensor is dominated by heater element-based heating. The resistance change caused by interface cooling/heating represents only a fraction of that caused by the heater element of the resistance temperature sensor. It is generally difficult to know with certainty where head-media contact occurs based on a DC resistance measurement. One measure of the head-to-medium interface cooling condition is the rate of the temperature rise over heater power, or $\Delta R/\Delta P$. $\Delta R/\Delta P$ decreases with a better cooling condition.

ΔR/ΔP reaches a minimum at head-media contact. ΔR/ΔP will increase again after head-media contact due to frictional heating. The head-media contact can be detected by monitoring the metric ΔR/ΔP instead of the head modulation. ΔR/ΔP deviates (drops) from a linear trend first before it reaches the minimum. This signature indicates the cooling caused by initiation of the head-media contact. The minimum point of ΔR/ΔP indicates full head-media contact and that heat is generated by friction. Various methods of detecting head-media contact utilize the rate of the temperature rise in a head transducer over heater power supplied to a head transducer heater. A change in phase of the thermal sensor signal relative to a reference signal can also be used to detect head-media contact.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
   a near-field transducer at or near an air bearing surface of the apparatus;
   a write pole at or near the air bearing surface and proximate the near-field transducer; and
   a thermal sensor at the air bearing surface and within a protrusion region of the air bearing surface defined relative to at least one of the near-field transducer and the write pole, the protrusion region defined by a region of the air bearing surface that protrudes by at least 70% relative to a region of maximum protrusion of the air bearing surface, the thermal sensor configured to produce a signal indicative of a temperature at the protrusion region.

2. The apparatus of claim 1, wherein the protrusion region is defined by a region of the air bearing surface that protrudes between 70% and 80% relative to the region of maximum protrusion of the air bearing surface.

3. The apparatus of claim 1, wherein the protrusion region is defined by a region of the air bearing surface that protrudes between 80% and 90% relative to the region of maximum protrusion of the air bearing surface.

4. The apparatus of claim 1, wherein the protrusion region is defined by a region of the air bearing surface that protrudes between 90% and 95% relative to the region of maximum protrusion of the air bearing surface.

5. The apparatus of claim 1, wherein the protrusion region is defined by a region of the air bearing surface that protrudes by at least 95% relative to the region of maximum protrusion of the air bearing surface.

6. The apparatus of claim 1, wherein:
   the apparatus comprises a plurality of thermal sensors, and
   at least two of the plurality of thermal sensors are within the protrusion region.

7. The apparatus of claim 1, wherein at least a portion of the thermal sensor is co-extensive with at least a portion of the write pole along an axis normal to the air bearing surface.

8. The apparatus of claim 1, wherein:
   the apparatus comprises a write coil configured to energize the write pole; and
   the thermal sensor is located between the write pole and the write coil.

9. The apparatus of claim 1, wherein:
   the apparatus comprises a reader; and
   the thermal sensor is located adjacent the write pole and on a side of the write pole opposite the reader.

10. The apparatus of claim 1, wherein:
    the apparatus comprises a reader; and
    the thermal sensor is located between the write pole and the reader.

11. The apparatus of claim 1, wherein:
    the apparatus comprises a heater and a waveguide optically coupled to the near-field transducer; and
    the thermal sensor is located between the waveguide and the heater.

12. The apparatus of claim 1, wherein:
    the apparatus comprises a write return pole; and
    the protrusion region comprises a region of the air bearing surface between the write pole and the write return pole.

13. The apparatus of claim 1, wherein:
    the apparatus comprises a write return pole; and
    the protrusion region comprises a region of the air bearing surface between the write return pole and the near-field transducer.

14. The apparatus of claim 1, wherein:
    the apparatus comprises a write return pole and a waveguide optically coupled to the near-field transducer; and
    the protrusion region comprises a region of the air bearing surface between the write return pole and waveguide.

15. The apparatus of claim 1, wherein the protrusion region comprises a region of the air bearing surface originating at at least one of the near-field transducer and the write pole and extending no more than about 3 μm therefrom.

16. The apparatus of claim 1, wherein the protrusion region comprises a region of the air bearing surface originating at at least one of the near-field transducer and the write pole and extending no more than about 2 μm therefrom.

17. The apparatus of claim 1, wherein the protrusion region is defined by a contoured region of the air bearing surface surrounding one or both of the near-field transducer and the write pole, wherein each location along a periphery of the contoured region represents air bearing protrusion of substantially equal magnitude.

18. The apparatus of claim 1, wherein the protrusion region comprises a planar or volumetric portion of the air bearing surface.

19. An apparatus, comprising:
    a near-field transducer at or near an air bearing surface of the apparatus;
    a write pole at or near the air bearing surface and proximate the near-field transducer;
    a thermal sensor at the air bearing surface and within a protrusion region defined relative to at least one of the near-field transducer and the write pole, the protrusion region defined by a region of the air bearing surface that protrudes by at least 70% relative to a region of maximum protrusion of the air bearing surface, and the thermal sensor configured to produce a signal that varies in relation to a change in separation between the air bearing surface and a magnetic storage medium in proximity to the apparatus; and
    a processor coupled to the thermal sensor and configured to detect one or both of head-media separation changes and head-media contact using the thermal sensor signal.

20. The apparatus of claim 19, further comprising a heater configured to thermally activate the write pole;
    wherein the processor is configured to adjust power supplied to the heater when at least the near-field transducer is activated for adjusting a separation between the air bearing surface and the magnetic storage medium.

* * * * *